United States Patent

Mochida et al.

[11] Patent Number: 5,995,508
[45] Date of Patent: Nov. 30, 1999

[54] LINE ADAPTER FOR CELL SWITCHING MACHINE

[75] Inventors: Takayasu Mochida; Yoshio Morita, both of Yokohama; Takaaki Kato, Nagoya, all of Japan

[73] Assignee: Fujitsu Limited, Kanagawa, Japan

[21] Appl. No.: 08/764,955

[22] Filed: Dec. 13, 1996

[30] Foreign Application Priority Data

Jul. 16, 1996 [JP] Japan ................................. 8-186310

[51] Int. Cl.⁶ .......................... H04L 12/28; H04L 12/56
[52] U.S. Cl. ..................... 370/395; 370/412; 370/419
[58] Field of Search ................................ 370/247, 395, 370/389, 412, 413, 414, 420, 465, 466, 467, 469, 473, 474, 337, 347, 352, 360, 370, 437, 443, 230, 419, 468, 428, 232, 331

[56] References Cited

U.S. PATENT DOCUMENTS

| | | | |
|---|---|---|---|
| 5,504,744 | 4/1996 | Adams et al. | 370/232 |
| 5,537,400 | 7/1996 | Diaz et al. | 370/396 |
| 5,555,243 | 9/1996 | Kakuma et al. | 370/352 |
| 5,555,265 | 9/1996 | Kakuma et al. | 370/395 |
| 5,602,830 | 2/1997 | Fichou et al. | 370/232 |
| 5,633,868 | 5/1997 | Baldwin et al. | 370/331 |
| 5,696,764 | 12/1997 | Soumiya et al. | 370/395 |
| 5,784,358 | 7/1998 | Smith et al. | 370/230 |

*Primary Examiner*—Dang Ton
*Assistant Examiner*—Phirin Sam
*Attorney, Agent, or Firm*—Helfgott & Karas, P.C.

[57] ABSTRACT

A shaper circuit is provided in a line adapter, not in an ATM switch. A billing section is provided on the output side of the shaper circuit. The shaper circuit is configured to output M cells for N cell slots at a temporally smooth rate, where M and N are integers. This configuration serves to optimize buffer capacity for shaping, prevents charging for discarded cells, and allows a full rate setting matched to a line speed.

8 Claims, 6 Drawing Sheets

LINE ADAPTER FOR CELL SWITCHING MACHINE

BACKGROUND OF THE INVENTION

1. Field of the Invention

The present invention relates to the configuration of a line adapter that interfaces between an ATM switch section and each line accommodated in an asynchronous transfer mode (ATM) switching machine that accommodates high-speed and low-speed lines in intermingled fashion and performs cell-based switching.

2. Description of the Related Art

In an ATM switching machine accommodating high-speed lines operating at 46 Mbits/s, 155 Mbits/s, etc. and low-speed lines operating at 6 Mbits/s, 1.5 Mbits/s, etc. in intermingled fashion, cell traffic from the ATM switch section fluctuates greatly, and therefore, it is necessary to provide a shaper circuit for smoothing out the traffic for delivery to each line.

A shaper circuit has on its input side a cell buffer for storing cells. Arriving cells are temporarily stored in the cell buffer, and read out and output at a constant rate, thus smoothing out the cell traffic. According to traffic theory, when there is a large difference between the incoming cell highway speed and the outgoing cell rate (line rate) in the shaper circuit (which means that the outgoing line rate is low), the cell buffering capacity of the cell buffer must be increased to reduce the cell loss rate (CLR).

Traditionally, such a shaper circuit has been placed in the ATM switch section, in which case, however, a cell buffer having a capacity matched to a low-speed line had to be provided for each line so that various kinds of lines of different speeds can be supported. Such cell capacity is redundant for high-speed lines, and increases the cost of the ATM switching machine.

Generally, in ATM switching, a charge is made to a subscriber based on the cell amount transmitted to the subscriber's line. On the other hand, in a shaper circuit, when cells are input in bursts, cell loss may occur; therefore, a measure must be taken to prevent a charge from being made for discarded cells.

In the prior art, the shaper circuit has been constructed to read out a cell for output for every N cell slots, where N is a value equal to the incoming cell highway speed divided by a specified outgoing cell rate. Here, N is not limited to an integer but may take a real number given in fixed point representation. The shaper circuit may sometimes be required to output cells at a rate perfectly matched to the line speed (at full rate) in order to minimize cell discard in the shaper circuit. In this case, the N is set to a value equal to the system cell highway speed divided by the line speed. This value is not always expressed in fixed point representation with a finite number of digits, such as 3/7, and in such a case, the above prior art shaper circuit cannot output cells at exactly the full rate.

For cells output on the line from the ATM switching system, a format conversion buffer is provided that converts data contained in the cells conforming to the cell format in the ATM switching machine, to the cell format on the outgoing line. Further, a phase-locked oscillator (PLO) is used to synchronize the line clock to the system clock. However, when system switching is made for the purpose of system maintenance, etc., a situation occurs where the PLO is temporarily put out of synchronization. In this situation, if the system speed is high and the line speed is low, there is a possibility that cells exceeding the capacity of the cell buffer may be sent out. This has necessitated the provision of a buffer capacity larger than that used in normal system operation.

In the prior art, since a method has been employed in which human operators perform checks by tracing output cell data, cell slots, etc. using general-purpose measuring instruments, there has been a limitation in testing the speed and cell rate under actual operating conditions. Furthermore, the need for necessary measuring instruments has lead to an increase in cost.

SUMMARY OF THE INVENTION

It is, accordingly, an object of the present invention to propose the configuration of a line adapter for an ATM switching machine, that overcomes the above-outlined problems.

According to the present invention, there is provided a line adapter, for use with a cell switching machine, for accommodating a communication line having a prescribed line speed in a cell switching section that performs cell based switching, comprising: a receive buffer for temporarily storing cells from the cell switching section; a shaper circuit for reading out the cells stored in the receive buffer for output at a specified cell rate; and a format conversion circuit for mapping data, contained in the cells output from the shaper circuit, to a cell format on the communication line.

By providing the shaper circuit in the line adapter, not in the ATM switch section, the receive buffer can be constructed with a cell buffering capacity matched to the line speed can be provided.

Preferably, the line adapter further comprises a billing section for performing billing by counting the cells output from the shaper circuit.

By performing billing for the cells output from the shaper circuit, making a charge for discarded cells can be prevented.

Preferably, the shaper circuit outputs M cells for N cell slots at a constant rate in time, where M and N are integers.

By setting M/N as a ratio of line speed to cell slot speed, a full rate setting can be made.

Preferably, the format conversion circuit includes a transmit format conversion buffer for temporarily storing the cells for mapping, the transmit format conversion buffer sends a busy signal to the shaper circuit when the number of cells stored therein has exceeded a prescribed number, and the shaper circuit, in response to the busy signal, stops sending out cells.

Preferably, the line adapter further comprises: a selector for switching an input line to the receive buffer between the cell switching section and a test cell generator; a first counter for counting the cells output from the shaper circuit for a prescribed duration of time; and a second counter for counting cell slots for the prescribed duration of time.

Also preferably, the line adapter further comprises: a selector for switching an input line to the receive buffer between the cell switching section and an output of a test cell generator; a first counter for counting the cells that the shaper circuit outputs at intervals of Y cell slots, where Y is an integer obtained by truncating N/M to a whole number; and a second counter for counting the cells that the shaper circuit outputs at intervals of (Y+1) cell slots.

DESCRIPTION OF THE PREFERRED EMBODIMENTS

Figure 1:
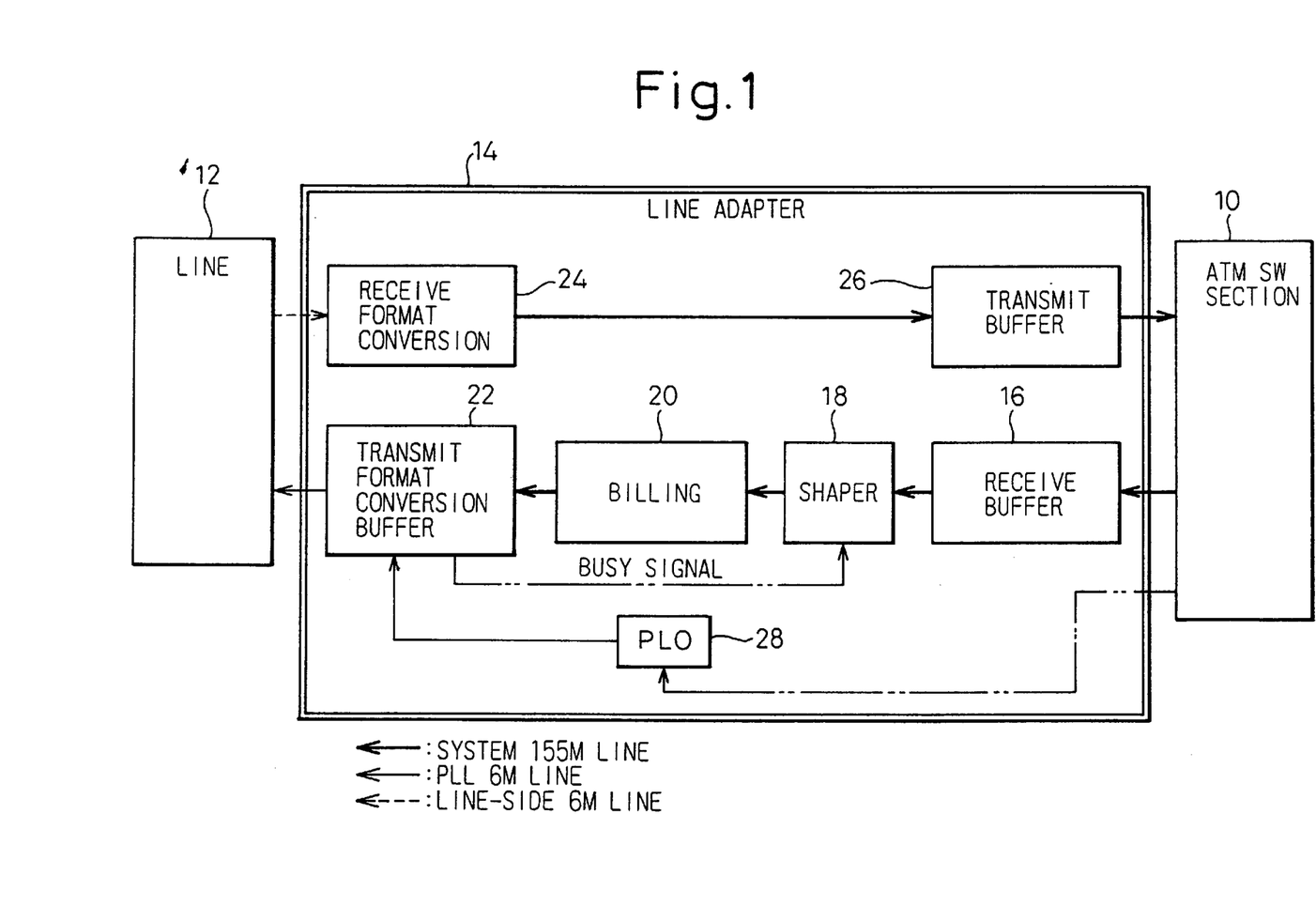
FIG. 1 is a block diagram showing in simplified form the configuration of a line adapter according to the present invention.

FIG. 1 is a diagram showing, in simplified form, the configuration of a line adapter, according to one embodiment of the present invention, for interfacing a line 12 with an ATM switch section 10 capable of accommodating lines from 6-Mbps low-speed lines up to 155-Mbps high-speed lines. In the figure, thick lines show a cell highway transferring ATM cells at a rate of 155.52 Mbps, while thin lines indicate an operating clock and a 6.144-Mbps line synchronized to the system, a dotted line indicates a line synchronized to the line 12 and operating at 6.144 Mbps, and dashed lines show other signal lines.

A receive buffer 16 temporarily stores cells output from the ATM switch section 10. A shaper circuit 18 reads out the cells stored in the receive buffer 16 for output at a specified rate. A billing section 20 performs billing by counting the cells output from the shaper circuit 18. A transmit format conversion buffer 22 temporarily stores the cells output from the billing section 20, and converts them from the system cell format of 54 octets/cell to the line cell format of 53 octets/cell for output onto the line 12. A receive format conversion section 24 converts the cells, received from the line 12, from the line cell format to the system cell format, and outputs the cells on the 155.52-Mbps cell highway. A transmit buffer 26 temporarily stores the cells output from the receive format conversion section 24, and then outputs them to the ATM switch section 10. A phase-locked oscillator 28 generates a clock for the 6-Mbps line synchronized to the system clock, and supplies the clock to the transmit format conversion buffer 22.

The line adapter is selected for use according to the speed of the line accommodated therein. In other words, the speed of the line connected to each individual line adapter is predetermined. In the present invention, since the shaper circuit is provided in the line adapter 14, not in the ATM switch section 10, the receive buffer 16 can be designed with an appropriate cell buffering capacity matched to the speed of the line supposed to be connected to it.

When cells are input in bursts from the ATM switch section 10, the receive buffer 16 overflows and cell discard occurs. In the line adapter 14 of the present invention, since the billing section 20 is placed on the output side of the shaper circuit 18, there is no possibility of charging the user for discarded cells.

On the other hand, on the downstream side of the billing section 20, the occurrence of cell discard is not allowed. However, as previously described, when system switching is made for the purpose of system maintenance, etc., the PLO 28 may be put out of synchronization, causing the transmit format conversion buffer 22 to overflow and thus resulting in cell discard. To avoid this situation, in the line adapter 14 of the present invention, when the number of cells stored in the transmit format conversion buffer 22 exceeds a predetermined threshold value, a busy signal is output, in response to which the shaper circuit 18 stops outputting cells. The number of cells stored is determined by taking the difference between the number of cells written to the buffer 22 and the number of cells read out of it.

Figure 2:
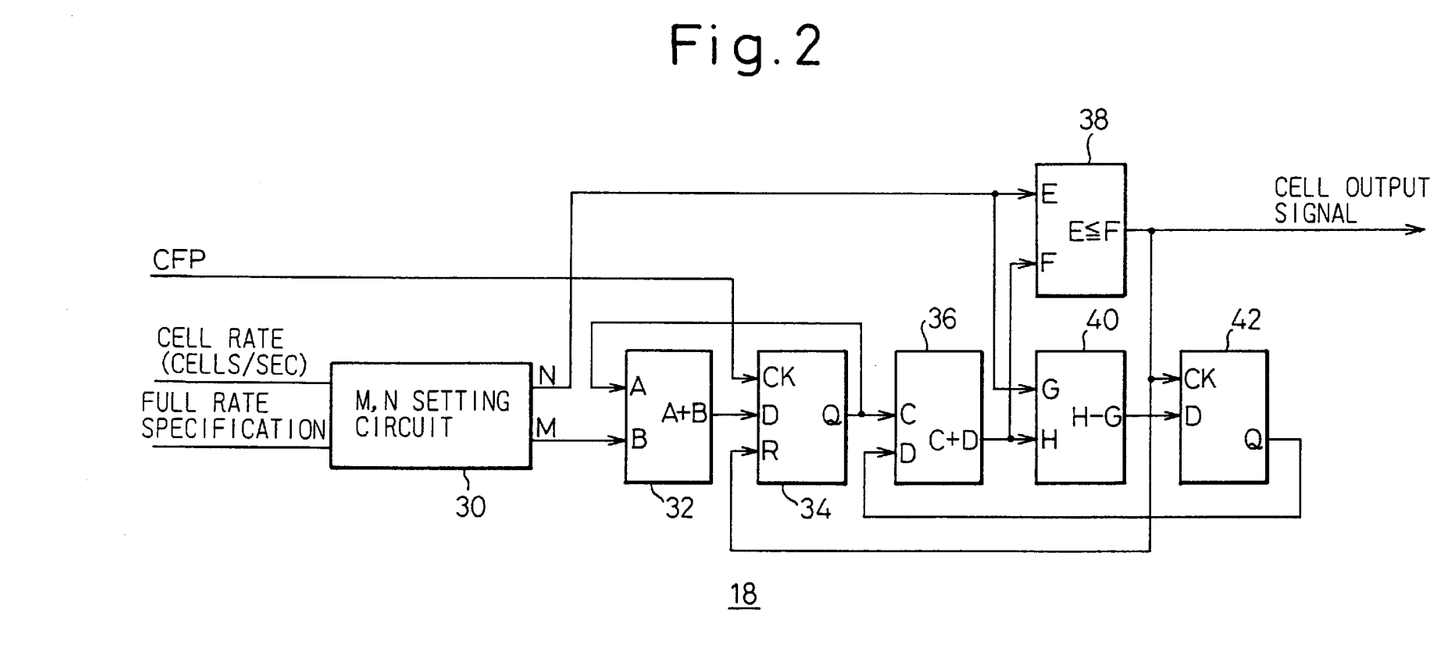
FIG. 2 is a circuit diagram showing one example of the detailed configuration of a shaper circuit 18.

FIG. 2 shows an example of the detailed configuration of the shaper circuit 18. The shaper circuit 18 of the present invention outputs M cells for N cell slots at a temporally smooth rate, where M and N are integers. When $M \geq N$, a cell is output for each slot. When M is 0, the output of cells is stopped.

In FIG. 2, an M, N setting circuit 30 determines M and N from the specified cell rate, and outputs the determined values. If full rate is specified, the M, N setting circuit 30 determines the values of M and N for a full rate output, and outputs the determined values. The method of determining M and N will be described later. Alternatively, the values of M and N may be set by inputting values directly from the outside.

An adder 32 adds the value of M to the value latched in a flip-flop 34, while the flip-flop 34 latches the output of the adder 32 in synchronism with a cell frame pulse (CFP) that indicates the beginning of a cell slot. Accordingly, the value latched in the flip-flop 34 is incremented by M for each cell slot until it is reset. An adder 36 adds a value remaining after N is subtracted from its previous value (as described below), to the value latched in the flip-flop 34. A comparator 38 compares the output of the adder 36 with the value of N, and if the output of the adder 36 is equal to or larger than N, outputs a cell output signal, and at the same time, the flip-flop 34 is reset. A subtractor 40 subtracts N from the output of the adder 36, and the result is latched into a flip-flop 42 upon the output of the cell output signal, and is fed to the adder 36, as noted above. That is, if the circuit consisting of the adder 32, the flip-flop 34, the adder 36, the subtractor 40, and the flip-flop 42 is thought of as constituting a counter with the output of the adder 36 as its output, the output of this counter is incremented by M for each cell slot, and when the counter output becomes equal to or larger than N, a cell is output, and at the same time, the counter is decremented by N.

Figure 3:
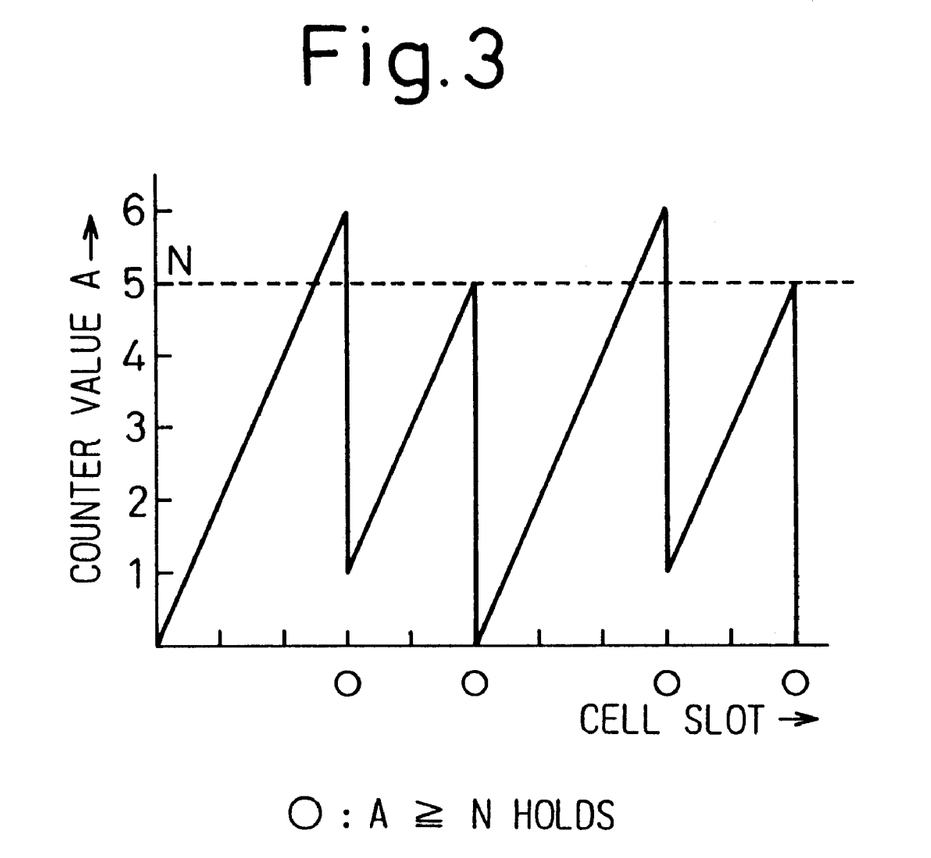
FIG. 3 is a diagram for explaining the operation of the shaper circuit.

FIG. 3 is a diagram for explaining the operation of the shaper circuit 18 when M=2 and N=5. In FIG. 3, the counter is initially set to 0, and is incremented by M=2 for each cell slot. In the third cell slot, since the counter value becomes 6 which is larger than N, a cell is output, and at the same time, N=5 is subtracted, so that the counter value is now 1. In the fifth cell slot, the counter value becomes 5, and a cell is output. In this way, M cells are output for N cell slots at a temporally smooth rate.

Next, an explanation will be given of how the values of M and N are determined when a full rate output is specified. It is assumed here that each cell in the system consists of 54 octets, and also that the bit rate of the cell highway in the system is 155.52 Mbps capable of accommodating a 155-Mbps high-speed line. Similarly, it is assumed that each cell on the line consists of 53 octets and the line rate is 6.144 Mbps. At this time, the M-to-N ratio can be expressed by $$\frac{M}{N} = \frac{6.144/53}{155.52/54}$$

$$= \frac{6.144}{155.52 \times (53/54)}$$

$$= \frac{6.144}{152.64}$$

Therefore, by setting N=152640000 (bps) and M=6144000 (bps), cells can be output at full rate. For line rates other than 6.144 Mbps also, as long as the line rate is an integral multiple of 1 bps, cells can be output at full rate by fixing N to 152640000 and by using the value of the line rate in bps as the value of M. Since 152640000 is H 9191A00 in hexadecimal notation, the counter must have a length of 28 bits.

As shown in FIG. 2, the output cell rate of the shaper circuit is usually set in units of cells per second. This setting does not always ensure the full rate setting. The reason is that one cell corresponds to 53×8=424 bits but the line rate is not always a multiple of 424 bps. For this reason, the M, N setting circuit 30 of FIG. 2 has a separate input for full rate specification. Alternatively, provisions may be made so that if a value specified in cells per second is larger than the full rate value, then the specified value is regarded as specifying the full rate. In that case, the input for full rate specification need not be provided.

Figure 4:
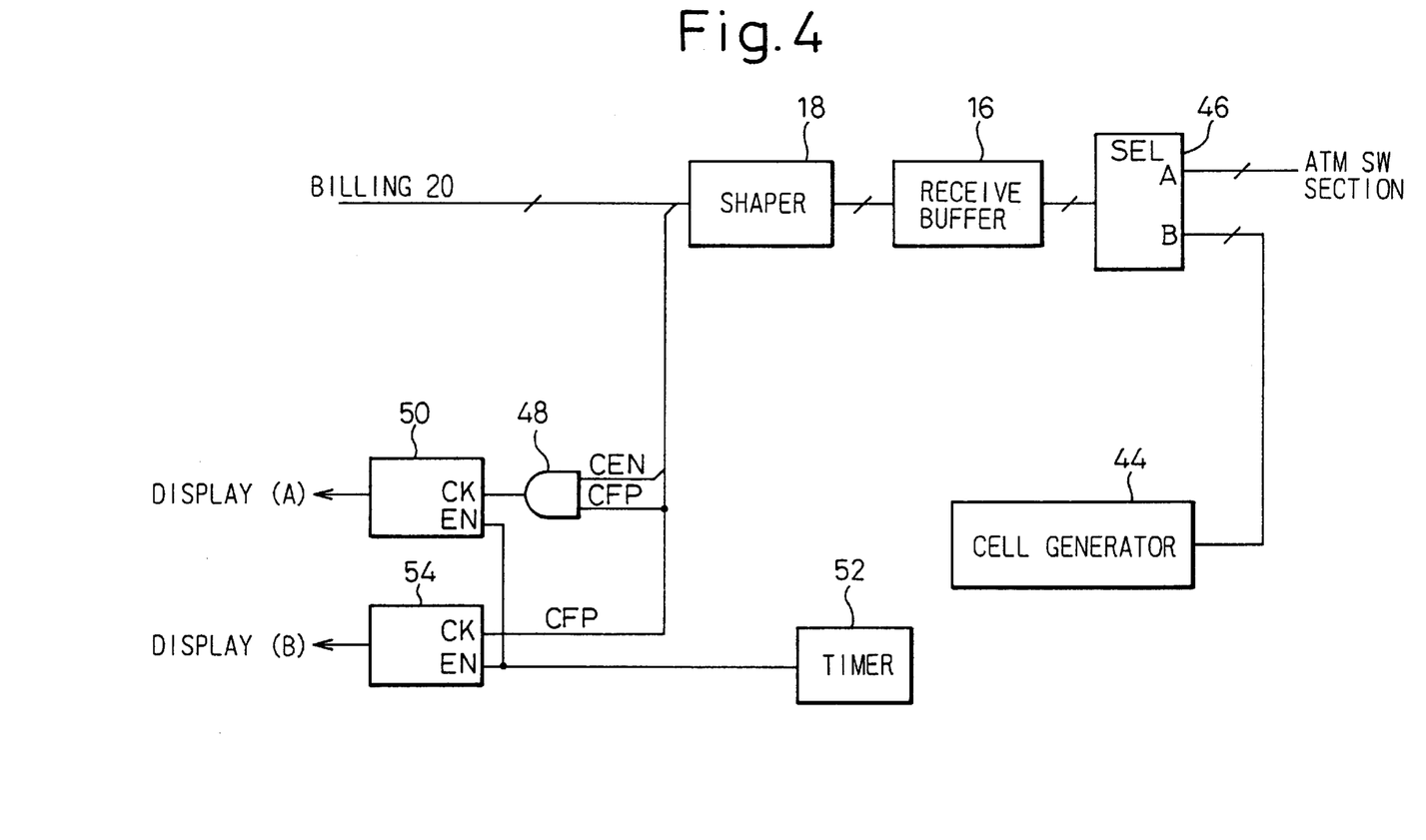
FIG. 4 is a circuit diagram showing a first example of a device for performing an operational test of the shaper circuit.

FIG. 4 shows the configuration of a device, provided in the line adapter 14, for performing an operational test of the shaper circuit 18. A cell generator 44 generates cells at various set rates. The cell generator 44 need not necessarily be incorporated in the line adapter 14, but may be connected to it when performing the test. A selector 46 selects one or other of the cell highways, one from the ATM switch section and the other from the cell generator 44, for connection to the input of the shaper 18. An AND circuit 48 ANDs a cell enable (CEN) signal and a cell frame pulse (CFP) output on the outgoing highway of the shaper circuit 18, and outputs the result. A counter 50 counts the pulses output from the AND circuit 48 for a period specified by a timer 52. A counter 54 counts CFPs for the period specified by the timer 52. Count values from the counters 50 and 54 are displayed using appropriate display means.

Figure 5:
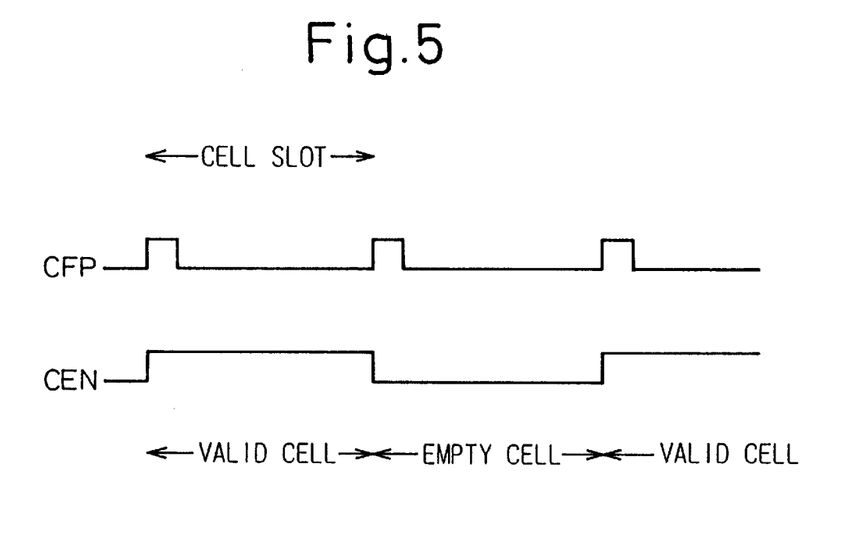
FIG. 5 is a diagram for explaining signals CFP and CEN.

As shown in FIG. 5, CFP indicates the beginning of a cell slot, and CEN indicates whether a cell slot contains a valid cell or an empty cell. Therefore, the value B of the counter 54 indicates the number of cell slots for the period specified by the timer 52, and the value A of the counter 50 indicates the number of valid cells output from the shaper 18 during the same period. For various measuring times, the count values A and B of the counters 50 and 54 are read to verify that A/B coincides with M/N.

Figure 6:
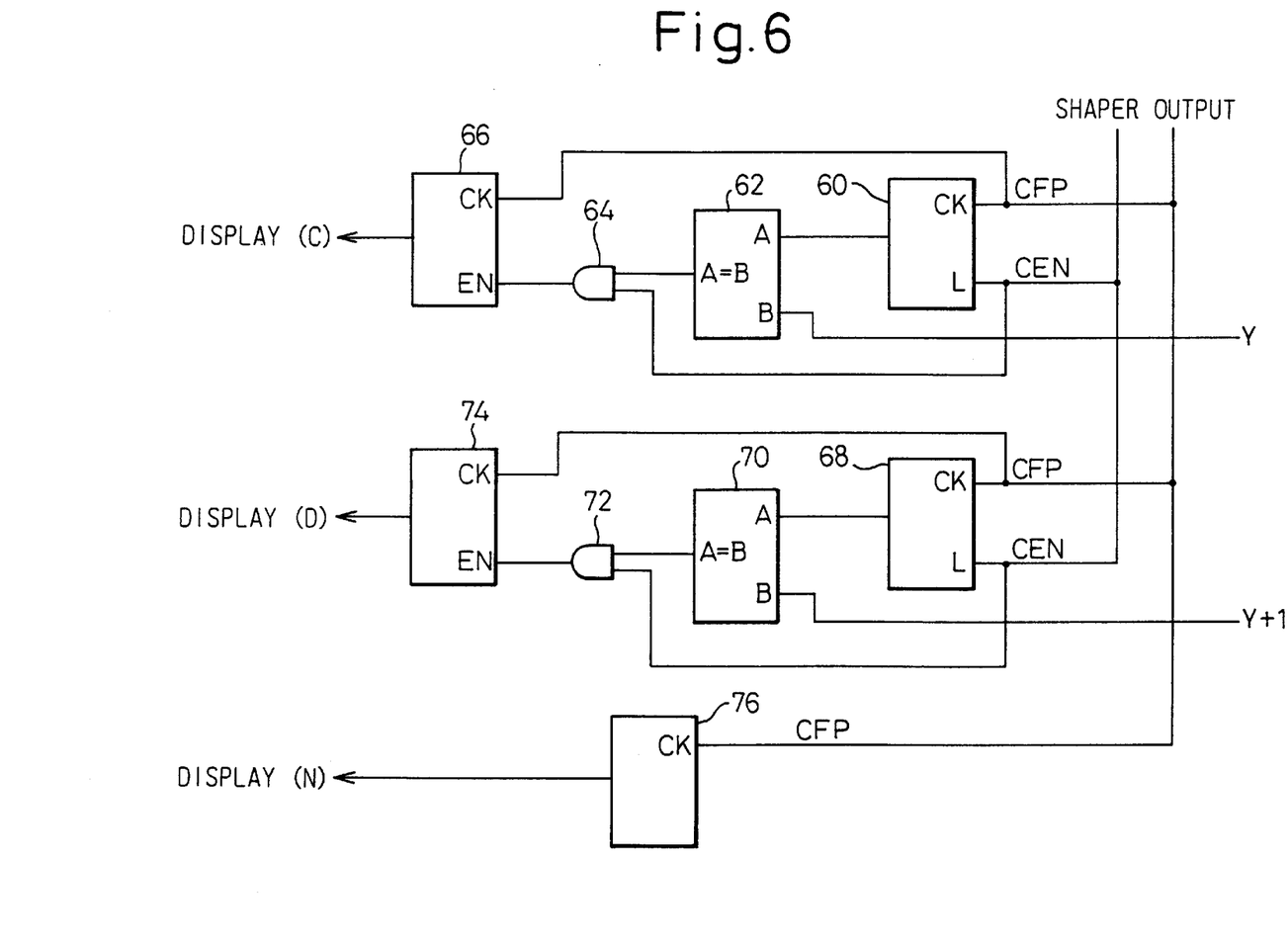
FIG. 6 is a circuit diagram showing a second example of the device for performing an operational test of the shaper circuit

FIG. 6 shows an alternative configuration of the device for performing an operational test of the shaper circuit 18. In FIG. 6, the cell generator 44, selector 46, receive buffer 16, and shaper circuit 18 shown in FIG. 4 are omitted.

When an integer obtained by truncating N/M to a whole number is denoted by Y, if the shaper circuit is operating normally and outputting M valid cells for N cell slots at a temporally smooth rate, only a pattern that outputs one valid cell for every Y cell slots and a pattern that outputs one cell slot for every (Y+1) cell slots should be output from the shaper circuit. When the number of times that the former pattern is output for N cell slots is denoted by C and the number of times that the latter pattern is output is denoted by D, then the following relations should hold.

$$C = M - Z$$

$$D = Z$$

where $Z = [(N/M) - Y] \times M$

When these relations hold, the shaper circuit is operating normally.

In FIG. 6, a counter 60, a comparator 62, an AND circuit 64, and a counter 66 together constitute a circuit for displaying the number, C, of patterns in which one valid cell is output for every Y cell slots, while a counter 68, a comparator 70, an AND circuit 72, and a counter 74 together constitute a circuit for displaying the number, D, of patterns in which one valid cell is output for every (Y+1) cell slots. Further, a counter 76 is a circuit for displaying the number, N, of cell slots.

In the circuit for displaying C, the counter 60 counts the number of cell slots from the last valid cell; when it is detected in the comparator 62 that this value becomes equal to Y, and when a valid cell is contained in the next cell slot, the AND circuit 64 produces a high-level output. Only when this occurs is the value of the counter 66 incremented by CFP; thus, the counter 66 shows the number, C, of patterns in which one valid cell is output for every Y cell slots. The circuit for displaying D operates in a similar manner. The values of Y and (Y+1) can be obtained by calculating them using an arithmetic circuit from the values of M and N output from the M, N setting circuit 30 (FIG. 2). In addition, it is desirable that provisions be made so that these values can also be set externally by maintenance personnel.

As described above, according to the present invention, the buffer capacity for the shaper circuit is optimized, charging for discarded cells is prevented, a full rate output is made possible, and an operational test of the shaper circuit can be performed.

We claim:

1. A line adapter for use in a cell switching machine, for connecting a communication line having a prescribed line speed to a cell switching section that performs a cell based switching, comprising:

a receive buffer for temporarily storing cells from the cell switching section;

a shaper circuit for reading out the cells stored in the receive buffer for output at a specified cell rate;

a format conversion circuit for mapping data contained in the cells output from the shaper circuit, to a cell format on the communication line, wherein the shaper circuit outputs M cells for N cell slots at a temporally smooth rate, where M and N are any integers.

2. A line adapter according to claim 1, wherein the shaper circuit includes:

a counter whose value is incremented by M for each cell slot; and a comparator for comparing the value of the counter with N, and when the value of the counter is equal to or larger than N, decrementing the value of the counter by N while permitting the cells in the receive buffer to be output.

3. A line adapter according to claim 1, wherein the value of N is fixed to an integer value corresponding to a cell slot speed regardless of the value of the specified cell rate.

4. A line adapter according to claim 3, wherein, when a full rate output is specified to the shaper circuit, an integer value corresponding to the line speed is set as the value of M.

5. A line adapter according to claim 3, wherein, when a bit rate corresponding to the specified cell rate exceeds the line speed, an integer value corresponding to the line speed is set as the value of M.

6. A line adapter for use in a cell switching machine, for connecting a communication line having a prescribed line speed to a cell switching section that performs a cell based switching, comprising:

a receive buffer for temporarily storing cells from the cell switching section;

a shaper circuit for reading out the cells stored in the receive buffer for output at a specified cell rate;

a format conversion circuit for mapping data contained in the cells output from the shaper circuit, to a cell format on the communication line, wherein the format conversion circuit includes a transmit format conversion buffer for temporarily storing the cells for the mapping, the transmit format conversion buffer sends a busy signal to the shaper circuit when a number of cells stored therein has exceeded a prescribed number, and the shaper circuit, in response to the busy signal, stops sending out cells.

7. A line adapter for use in a cell switching machine, for connecting a communication line having a prescribed line speed to a cell switching section that performs a cell based switching, comprising:

a receive buffer for temporarily storing cells from the cell switching section;

a shaper circuit for reading out the cells stored in the receive buffer for output at a specified cell rate, the shaper circuit outputting M cells for N cell slots at a temporally smooth rate, where M and N are any integers;

a format conversion circuit for mapping data contained in the cells output from the shaper circuit, to a cell format on the communication line;

a selector for switching an input line to the receive buffer between the cell switching section and a cell generator generating cells for test;

a first counter for counting the cells output from the shaper circuit for a prescribed duration of time; and a second counter for counting cell slots for the prescribed duration of time.

8. A line adapter for use in a cell switching machine, for connecting a communication line having a prescribed line speed to a cell switching section that performs a cell based switching, comprising:

a receive buffer for temporarily storing cells from the cell switching section;

a shaper circuit for reading out the cells stored in the receive buffer for output at a specified cell rate, the shaper circuit outputting M cells for N cell slots at a temporally smooth rate, where M and N are any integers;

a format conversion circuit for mapping data contained in the cells output from the shaper circuit, to a cell format on the communication line a selector for switching an input line to the receive buffer between the cell switching section and an output of a cell generation generating cells for test;

a first counter for counting the cells that the shaper circuit outputs at intervals of Y cell slots, where Y is an integer obtained by truncating N/M to a whole number; and a second counter for counting the cells that the shaper circuit outputs at intervals of (Y+1) cell slots.

\* \* \* \* \*